Figure 1:
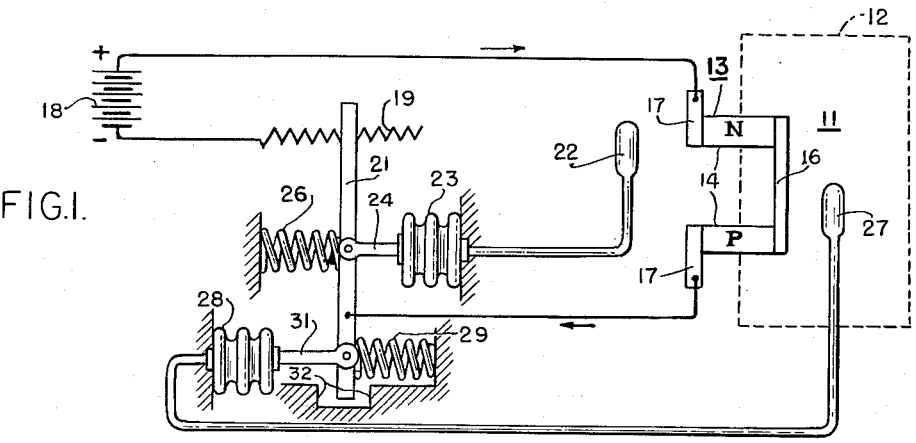

Sept. 5, 1961  J. D. MEESS ET AL  2,998,707
CONTROL APPARATUS AND METHOD FOR HEAT PUMPS
Filed March 22, 1960

INVENTORS.
JACK D. MEESS
EDSEL W. FRANTTI
BY *William D Foley*
ATTORNEY

United States Patent Office 2,998,707
Patented Sept. 5, 1961

2,998,707
CONTROL APPARATUS AND METHOD FOR HEAT PUMPS
Jack D. Meess, Export, and Edsel W. Frantti, Pittsburgh, Pa., assignors to Westinghouse Electric Corporation, East Pittsburgh, Pa., a corporation of Pennsylvania
Filed Mar. 22, 1960, Ser. No. 16,885
5 Claims. (Cl. 62—3)

This invention relates to apparatus and a method for controlling the operation of thermoelectric heat pumps, such as those employed in domestic refrigerators or the like.

The thermoelectric heat pump is a device utilizing the Peltier phenomena of heat absorption and heat dissipation at junctions between materials having unlike thermoelectric properties. Such devices are adapted to pump heat from one space or region to another space or region when an electrical current is passed through the junctions of the thermoelectric materials.

It has been recognized that there are optimum values of voltage and current for a given thermoelectric device by which maximum performance may be obtained from that device. The voltage to be applied to a thermoelectric heat pump is determined by the size and number of the thermoelectric bodies employed in the pump and the character of the materials from which they are made. The value of current to be applied is likewise determined by these factors and is additionally affected by the temperature conditions under which the pump is operated. It is known, for example, that for a thermoelectric heat pump applied to, say, a refrigerator whose cold junction temperature remains substantially constant, the current therethrough should be respectively increased or decreased as the ambient temperature, i.e. the temperature of the hot junction portion of the pump, increases or decreases in order to operate the pump at its maximum coefficient of performance. It is also recognized that for such applications the heat pump is called upon to remove varying quantities of heat from the refrigerated space inasmuch as the heat load is affected by such variables as changes in ambient temperature, opening and closing the access opening to the refrigerated space and the addition or removal of warm items from the space.

This invention envisions control of the current flow through a thermoelectric heat pump first in response to changes in temperature of the heat dissipating region of the pump so as to provide a current value by which the maximum performance may be obtained from the pump. The invention further envisions modifying, or adjusting, this current value within a limited range in accordance with changes of temperature in the heat absorbing region of the heat pump so as to compensate for variations in the heat load in the region cooled by the heat pump. This control method is based on the discovery that relatively small changes in the quantity of current supplied to the heat pump on either side of the optimum value for maximum performance have relatively small effect on the coefficient of performance of the heat pump but produce relatively large changes in the quantity of heat absorbed at the heat absorbing portion of the pump. Consequently, with the control method of this invention it is now possible to govern the operation of the heat pump in such a manner as to take care of a varying heat load on the heat absorbing portion of the pump while maintaining near peak coefficient of performance of the pump as dictated by changes in temperature condition at the heat dissipating region of the pump.

Figure 2:
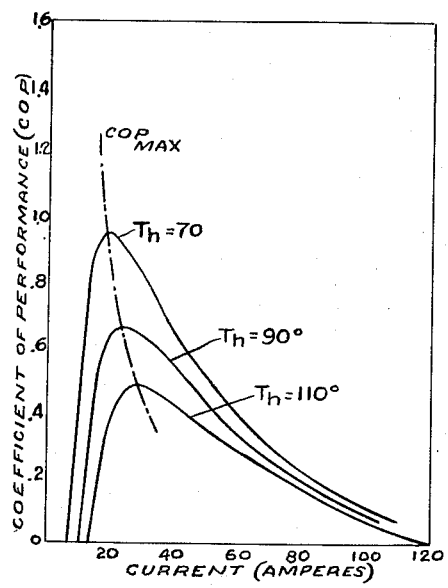
Figure 3:
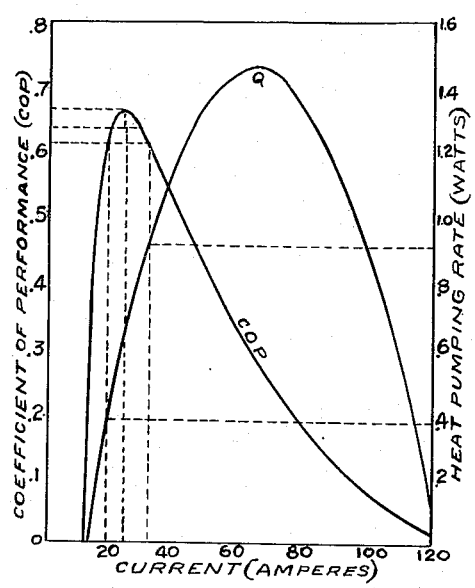

The invention is explained in greater detail in the detailed description which follows and wherein reference is made to the accompanying drawing, forming a part hereof, and wherein:

FIG. 1 is a schematic illustration of a thermoelectric heat pump system embodying this invention; and FIGS. 2 and 3 are curves depicting operating characteristics of a typical thermoelectric heat pump.

The thermoelectric heat pump system illustrated in FIG. 1 is adapted to remove heat from a region or space 11 confined by an insulated cabinet structure indicated at 12. The cabinet structure 12 may, for example, be that of a domestic refrigerator such as is commonly used for the preservation of foodstuffs.

Heat is removed from space 11 by means of a heat pump 13 comprising at least two bodies 14 formed of dissimilar thermoelectric materials. The two bodies 14 are distinguished in the drawing by the letters N and P, designating, respectively, materials having negative and positive thermoelectric characteristics. There are a number of known materials from which such thermoelectric bodies 14 can be formed, of which the best known is bismuth telluride doped with various "impurities" to give the material either positive or negative thermoelectric characteristics.

The thermoelectric bodies 14 are connected by means of a conducting strip 16, formed of copper or other good electrical and heat conducting material, which provide the cold junction, or heat absorbing portion of the heat pump 13. Other conducting members, indicated at 17, are joined to the opposite ends of bodies 14 to form hot junctions with the bodies and provide a heat dissipating structure in heat exchange relation with air outside the insulated cabinet structure 12.

Electrical current is supplied to the heat pump 13 from a source 18 of direct current. Current flow is indicated in the drawing by arrows as flowing first through the N body 14, then through the P body 14 which, in accordance with the Peltier phenomena, results in heat being absorbed at the junctions with the conducting strip 16 and heat being liberated at the junctions with conducting strip 17.

In accordance with this invention the flow of electrical current to the heat pump 13 is controlled in response to temperature conditions existing both in the region 11 to be cooled and the region outside insulating cabinet 12. For this purpose, a variable resistor, or potentiometer, 19 having a slider 21 is connected in series circuit with the heat pump 13 in one of the electrical leads connecting the heat pump and the current source 18. As is well understood, moving the slider 21 to different positions on the resistor 19 changes the voltage drop through the resistor 19, and, consequently, changes the value of the current flowing through the heat pump 13.

The control apparatus of this invention further includes a first temperature sensitive means responsive to the temperature in the heat dissipating region, i.e. conductor strips 17, of the heat pump and which includes a temperature sensing bulb 22 positioned at the heat dissipating region of the heat pump. Bulb 22 is connected to and controls the expansion and contraction of a bellows 23 which is pivotally connected to the slider 21 by a link 24. The bulb 22 and the bellows 23 are charged with a fluid which expands or contracts in response to an increase or decrease in the temperature of the bulb 22. Change in volume of fluid within the bellows 23 results in expansion or contraction of the bellows and movement of the bellows is transmitted by link 24 to slider 21 to change the position of the slider on the resistor 19. This control means includes a biasing spring 26 acting in opposition to bellows 23 for maintaining a positive pressure condition within bellows 23 and bulb 22.

In operation, this first temperature sensitive means is effective to move slider 21 to the left along resistor 19 to increase electrical current flowing to the heat pump 13 or move the slider to the right to decrease the current flowing through the heat pump in response to sensing, respectively, an increase or a decrease in the temperature at its bulb 22. The purpose of this first temperature sensing means is to adjust the current flowing to the heat pump to a value at which optimum performance, i.e. maximum coefficient of performance, is obtained from the heat pump 13.

The control of this invention further utilizes a second temperature sensing means having a control bulb 27 disposed within region 11 for sensing the temperature at the heat absorbing region of heat pump 13. Bulb 27 communicates with a bellows 28 and both are charged with an expansible and contractible fluid which upon being subjected to changes in temperature in the region of the bulb 27 effects expansion and contraction of bellows 28 in opposition to a biasing spring 29. Movement of bellows 28 is transmitted to slider 21 by means of a link 31 pivotally connected to a lower end portion of the slider at a point more remote from the resistor 19 than the point at which link 24 of the first temperature sensing means is connected to the slider. An increase in the temperature of the heat absorbing region of the heat pump 13, as sensed by bulb 27, results in the lower end of slider 21 being moved to the right, with the result that the slider 21 pivots on its connection to link 24 and the upper end of the slider moves to the left on resistor 19, thereby increasing the flow of electrical current to the heat pump. Conversely, a reduction of temperature of bulb 27 results in slider 21 moving to the right along resistor 19, decreasing the current flow to the heat pump.

The effectiveness of the temperature sensing means comprising bulb 27 and bellows 28 is, in accordance with this invention, limited so that the second temperature sensing means can change the amount of current flowing to heat pump 13 within but a limited range of current values. This limiting means in the embodiment shown in the drawing comprises spaced stops 32 positioned within the path of movement of the lower end of slider 21. It can readily be seen that stops 32 limit the extent to which the lower end of the slider 21 may be moved by bellows 28 of the second temperature sensing means. Consequently, the second temperature sensing means is effective to change the quantity of current through the heat pump 13 only within a limited range. In other words, this second temperature sensing means is responsive to changes in temperature at the heat absorbing region of the heat pump but only to a limited degree so that extreme temperature changes at the heat absorbing region of the heat pump do not produce extreme movements of slider 21 nor extreme changes in current flow through the heat pump.

The resulting effect of the two temperature sensing means of this control arrangement is to exercise primary control of current flow through the heat pump in accordance with changes in temperature at the heat dissipating region of the heat pump (sensed by bulb 22) and to modify the current value thus selected in accordance with temperature conditions at the heat absorbing region of the heat pump (sensed by bulb 27) with the latter adjustment being effected over but a limited range of current values. The theory of operation of this control arrangement and its effect on improved heat pump performance can be best understood by reference to FIGS. 2 and 3, which depict typical operating characteristics of a thermoelectric heat pump.

The curves plotted in FIG. 2 show the effect of charging the temperature at the heat dissipating portion of a heat pump on the coefficient of performance of the heat pump. The coefficient of performance, which is the left-hand scale, is in terms of heat absorbed at the cold junctions of the heat pump:

$$COP = \frac{\text{heat absorbed } (Q)}{\text{input}}$$

and is plotted against a horizontal scale of current flowing through the heat pump. It can be seen from these curves that the current value by which maximum coefficient of performance is attained increases as the temperature ($T_h$) at the heat dissipating region of the heat pump increases, so that, in order to operate the heat pump at its maximum coefficient of performance under varying temperature conditions, it is desirable to change the current flowing therethrough in direct proportion to changes in temperature at the heat dissipating region of the pump. This function is performed by the first temperature sensing means, comprising bellows 23 and bulb 22, as described above.

In FIG. 3, a curve indicating the rate at which heat is pumped from the cold junctions of the heat pump (curve Q) is superimposed on a coefficient of performance curve for the same set of temperature conditions. The heat pumping rate is plotted on the right-hand scale against current on the horizontal scale. From this curve it can be seen that the current value corresponding to maximum or peak coefficient of performance is in a high slope, i.e., rapidly rising, portion of the Q curve, so that relatively small changes in current flow produce relatively large changes in the heat pumping rate. Thus, without appreciably sacrificing coefficient of performance, it is possible to vary the current through the heat pump by small amounts and, at the same time, effect substantial changes in the pumping rate to offset or compensate for changes in the heat load at the heat absorbing portion of the heat pump. For example, for the typical heat pump forming the basis for the curve of FIG. 3, it is possible to maintain the coefficient of performance within five percent of its maximum by utilizing corresponding small current changes below or above the optimum current values to produce changes of as high as 40 per cent in the heat pumping rate of the heat pump.

The operation of the control apparatus of FIG. 1 can be viewed in another manner. The second temperature sensitive means, namely bellows 28 and bulb 27, can be considered to vary the current to heat pump 13 over a limited range of current values in accordance with changes in the temperature at the heat absorbing portion of the heat pump. The first temperature sensitive means, namely bellows 23 and bulb 22, can then be said to be effective to shift the range of current values, i.e., simultaneously change the upper and lower limits of the range, in accordance with changes in ambient temperature, or temperature at the heat dissipating region of the heat pump. Certain of the appended claims express the invention from this point of view.

Regardless of the viewpoint taken, it can be appreciated that this invention enables a thermoelectric heat pump to be operated very near its peak performance while insuring sufficient control over the heat pumping rate of the device to compensate for variations in the heat load imposed on the device. Operation of a thermoelectric heat pump in this manner results in low cost of operation because only a minimum of electrical energy is consumed. Moreover, the quantity of heat dissipated by the heat pump is held to a minimum so that the size and weight of any heat exchange apparatus associated with heat dissipation are held to their minimum.

While the invention has been shown in but one form, it will be obvious to those skilled in the art that it is not so limited, but is susceptible of various changes and modifications without departing from the spirit thereof.

What is claimed is:

1. A method of operating a thermoelectric heat pump which comprises impressing a D.C. potential across said heat pump, continuously varying the amount of electric current flowing through the heat pump in accordance with the temperature of the heat dissipating portion of the pump to maximize the coefficient of performance of the pump and adjusting the varied current flow within predetermined limits in response to temperature changes at the heat absorbing portion of the pump.

2. The combination with a thermoelectric heat pump having cold and hot junctions in heat transfer relationship, respectively, with heat absorbing and heat dissipating portions of the pump and means for supplying electrical current to said heat pump, of means controlling the flow of electrical current to said pump and comprising first temperature sensitive means responsive to the temperature of the heat dissipating portion of the pump for respectively increasing or decreasing the flow of current through said pump as the temperature at the heat dissipating portion of the pump increases or decreases and second temperature sensitive means responsive to the temperature of said heat absorbing portion for modifying the current flow through said heat pump within predetermined limits to respectively increase or decrease the current flow determined by said first temperature sensitive means as the temperature at the heat absorbing portion of the pump increases or decreases.

3. The combination with a thermoelectric heat pump having cold and hot junctions in heat transfer relationship, respectively, with heat absorbing and heat dissipating portions of the pump and means for supplying electrical current to said heat pump, of means controlling the flow of electrical current to said pump and comprising means responsive to the temperature of the heat absorbing portion of the pump for respectively increasing or decreasing the current flow to said pump as the temperature of the heat absorbing portion increases or decreases, means limiting the effectiveness of said temperature responsive means to but a limited range of current values, and other means responsive to the temperature of the heat dissipating portion of said heat pump for shifting the range of current values in which said first named temperature responsive means is effective, said other temperature responsive means respectively raising or lowering the effective range of said first named temperature responsive means as the temperature at said heat dissipating portion of the heat pump increases or decreases.

4. The combination with a thermoelectric heat pump having cold and hot junctions in heat transfer relationship, respectively, with heat absorbing and heat dissipating portions of the pump and an electrical circuit for supplying electrical current to said heat pump, of means controlling the flow of electrical current through said circuit to said pump and comprising a variable potentiometer interposed in said circuit, first temperature sensitive means responsive to the temperature of the heat dissipating portion of the pump for adjusting said potentiometer and respectively increasing or decreasing the flow of current through said pump as the temperature at the heat dissipating portion of the pump increases or decreases, and second temperature sensitive means responsive to the temperature of said heat absorbing portion for also adjusting said potentiometer and modifying the current flow through said heat pump within predetermined limits to respectively increase or decrease the current flow determined by said first temperature sensitive means as the temperature at the heat absorbing portion of the pump increases or decreases.

5. The combination with a thermoelectric heat pump having cold and hot junctions in heat transfer relationship, respectively, with heat absorbing and heat dissipating portions of the pump and an electrical circuit for supplying electrical current to said heat pump, or means controlling the flow of electrical current through said circuit to said pump and comprising a variable potentiometer including a resistor and a slider connected in said circuit, means responsive to the temperature of the heat absorbing portion of the pump and including an expansible member for moving said slider relative to said resistor and respectively increasing or decreasing the current flow to said pump as the temperature of the heat absorbing portion increases or decreases, means including a pair of stops associated with said slider for limiting the effectiveness of said temperature responsive means to but a limited range of current values, and other means responsive to the temperature of the heat dissipating portion of said heat pump and including an expansible member for also moving said slider relative to said resistor and shifting the range of current values in which said first named temperature responsive means is effective, said other temperature responsive means being arranged to respectively raise or lower the effective range of said first named temperature responsive means as the temperature at said heat dissipating portion of the heat pump increases or decreases.

References Cited in the file of this patent

UNITED STATES PATENTS

| | | |
|---|---|---|
| 2,218,944 | Wolfert | Oct. 22, 1940 |
| 2,922,284 | Danielson | Jan. 26, 1960 |